United States Patent
Braedt

(10) Patent No.: US 7,883,437 B2
(45) Date of Patent: Feb. 8, 2011

(54) SPROCKET

(75) Inventor: Henrik Braedt, Wurzburg (DE)

(73) Assignee: SRAM Deutschland GmbH, Schweinfurt (DE)

( * ) Notice: Subject to any disclaimer, the term of this patent is extended or adjusted under 35 U.S.C. 154(b) by 0 days.

(21) Appl. No.: 11/949,641

(22) Filed: Dec. 3, 2007

(65) Prior Publication Data

US 2008/0132367 A1 Jun. 5, 2008

(30) Foreign Application Priority Data

Dec. 1, 2006 (DE) .................. 10 2006 057 168

(51) Int. Cl.
*F16H 55/12* (2006.01)
(52) U.S. Cl. .................. 474/160; 474/47; 474/94; 474/141; 474/144; 474/152; 474/158; 474/161; 474/162
(58) Field of Classification Search .......... 474/152, 474/161; *F16H 55/06, 55/30, 9/06; B62M 9/00, B62M 9/10*
See application file for complete search history.

(56) References Cited

U.S. PATENT DOCUMENTS

| 740,445 | A | * | 10/1903 | Langerfeld | .............. 474/152 |
| 2,863,323 | A | * | 12/1958 | Shaffer | .............. 474/162 |
| 5,782,712 | A | * | 7/1998 | Campagnolo | .............. 474/152 |
| 5,980,407 | A | * | 11/1999 | Takamori et al. | .............. 474/152 |
| 6,013,001 | A | * | 1/2000 | Miyoshi | .............. 474/160 |
| 6,572,500 | B2 | * | 6/2003 | Tetsuka | .............. 474/78 |

OTHER PUBLICATIONS

Picture of Shimano Dura-Ace Cassette Sprocket CS-7800.

* cited by examiner

*Primary Examiner*—Robert A Siconolfi
*Assistant Examiner*—San Aung
(74) *Attorney, Agent, or Firm*—Lisa Serdynski; Milan Milosevic

(57) ABSTRACT

A sprocket for transferring a force between a chain and a drive element that includes a plurality of teeth and a plurality of openings proximate the teeth. Each tooth has a load-bearing flank and a non-load-bearing flank. One of the plurality of openings are arranged relative to one of the plurality of teeth, in one-to-one correspondence therebetween, such that the opening is asymmetrically divided by a radial centerline of the tooth, a first load strip is formed between the opening and the load-bearing flank of the tooth, and a second load strip is formed between the opening and the non-load-bearing flank of the tooth.

4 Claims, 2 Drawing Sheets

SPROCKET

BACKGROUND OF THE INVENTION

The present invention relates to sprockets for transmitting a force between a chain and a drive element, and more particularly, to a sprocket having elastic teeth under load.

U.S. Pat. No. 5,980,407 discloses a rotary member in the form of a sprocket or a brake disc for transmitting a drive force or brake force. The rotary member has weight reduction openings disposed between an inner ring portion and an outer ring portion. Arms are formed between the weight reduction openings. The arms allow an elastic deformation of the outer ring portion relative to the inner ring portion when the chain engages the rotary member, but do not provide tooth elasticity.

Additionally, a Shimano cassette CS-7800 is also known that includes multiple sprockets, some of which have circular openings, each of which are disposed under a tooth. These openings are disposed symmetrically relative to their respective tooth centerlines. A disadvantage of this configuration is that the teeth still have a high degree of rigidity.

The first tooth of a conventional type sprocket that engages the chain carries a considerable portion of the total drive load, possibly up to 95% depending on the number of teeth, the flank angle, their distribution and other parameters. This leads to very high loading between the load-bearing flank of the tooth and the chain roller, causing wear on the surface of the load-bearing flank especially under cyclical chain loading.

Under normal bicycle operation, each tooth is subjected to different load levels depending on the type of bicycle. For example, with racing and mountain bikes, thin sprockets arranged close together receive high loads which may cause cracks to form in the teeth. These cracks may propagate causing the teeth to break. This condition may be aggravated by cutouts on the teeth that serve as shifting aides when changing gears which further reduces the thickness of the sprocket.

SUMMARY OF THE INVENTION

The present invention provides elasticity to individual teeth, permitting redistribution of peak loads from a primary load-bearing tooth to adjoining teeth. The present invention achieves tooth elasticity by providing a plurality of openings proximate the sprocket teeth. Each tooth has a load-bearing flank and a non-load-bearing flank. One of the plurality of openings is arranged relative to one of the plurality of teeth, in one-to-one correspondence therebetween, such that the opening is asymmetrically divided by a radial centerline of the tooth, a first load strip is formed between the opening and the load-bearing flank of the tooth, and a second load strip is formed between the opening and the non-load-bearing flank of the tooth.

In one embodiment of the present invention, when the chain engages the load-bearing flank of the tooth, the first load strip is configured to be loaded in tension and the second load strip is configured to be loaded in compression. The first load strip is longer than the second load strip. The first load strip of an adjoining tooth in the drive rotational direction is configured to be loaded in bending by the second load strip of the tooth. Multiple sequential teeth and opening pairings are configured in the one-to-one correspondence therebetween. The sprocket includes adjoining teeth having different contours and corresponding adjoining openings having different contours. In the present invention, the design of the load strips between the openings and the teeth may be varied to achieve the desired tooth elasticity for each sprocket configuration.

These and other features and advantages of the present invention will be more fully understood from the following description of one or more embodiments of the invention, taken together with the accompanying drawings.

DETAILED DESCRIPTION

Figure 1:
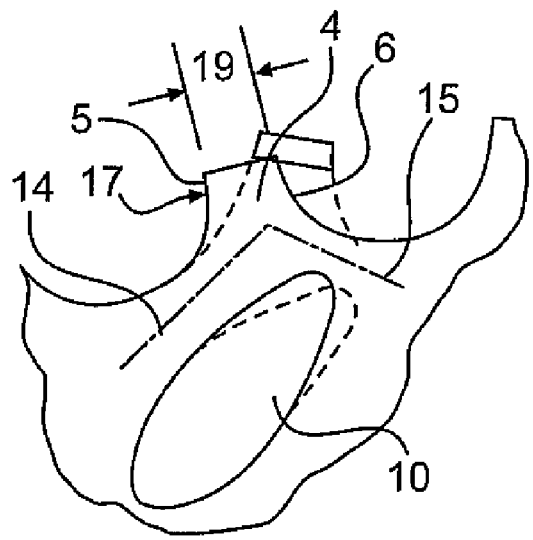
FIG. 1 is a partial view of the sprocket having one opening proximate one tooth.
Figure 2:
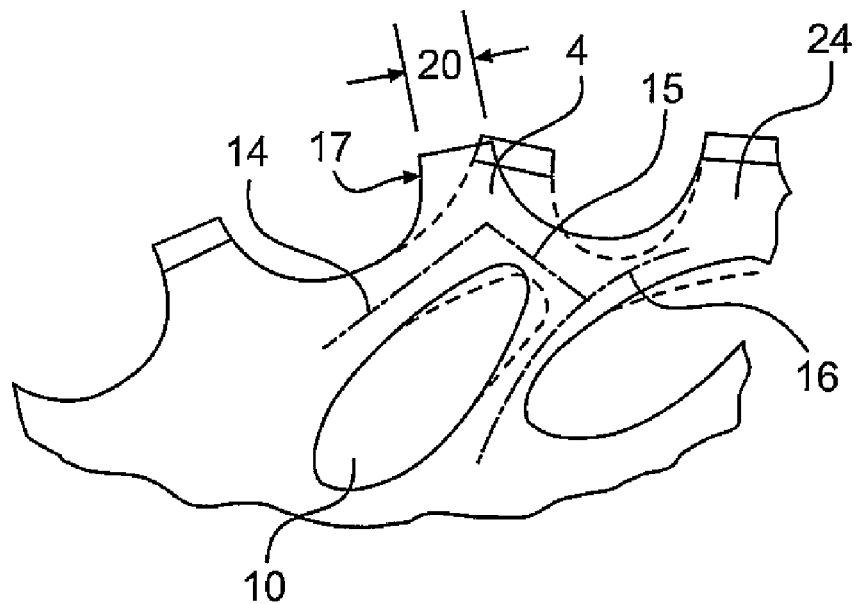
FIG. 2 is a partial view of the sprocket having two openings.

FIGS. 1-4 illustrate a sprocket 2 for a bicycle according to the present invention. Looking to FIGS. 3 and 4, the sprocket 2 generally includes a plurality of teeth 3 and a plurality of openings 10. The plurality of teeth 3 are disposed around an outer periphery of the sprocket 2. An inner periphery of the sprocket 2 is connected to a drive element 12. Each tooth has a load-bearing flank 5 and a non-load-bearing flank 6.

Figure 3:
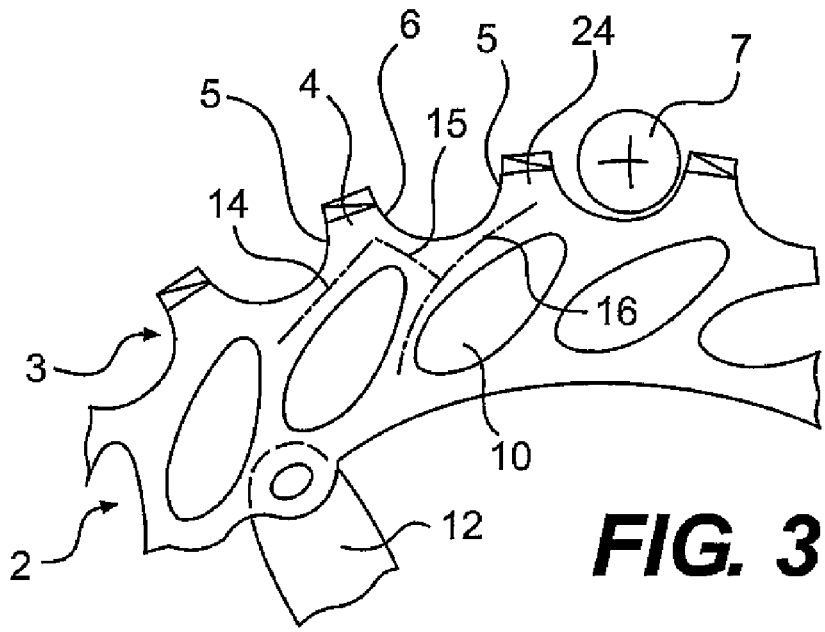
FIG. 3 is a partial view of the sprocket showing a roller engaging a tooth of the sprocket.

FIG. 3 shows an arrangement of the openings 10 over the entire circumference of the sprocket 2. The openings 10 are disposed proximate the plurality of teeth 3. In FIG. 3, each opening 10 is arranged relative to one of the teeth 3, in one-to-one correspondence therebetween, such that the opening 10 is asymmetrically divided by the radial centerline 8 of the tooth 4 (see FIG. 4). The centerline 8 extends through the center 22 of the sprocket and bisects the base of the tooth 4. The opening 10 has an oblong shape and a contour 11. A first load strip 14 is formed between the opening 10 and the load-bearing flank 5. A second load strip 15 is formed between the opening 10 and the non-load-bearing flank 6. The first and second load strips 14, 15 provide an elastic connection of the tooth 4 to the sprocket 2.

Figure 4:
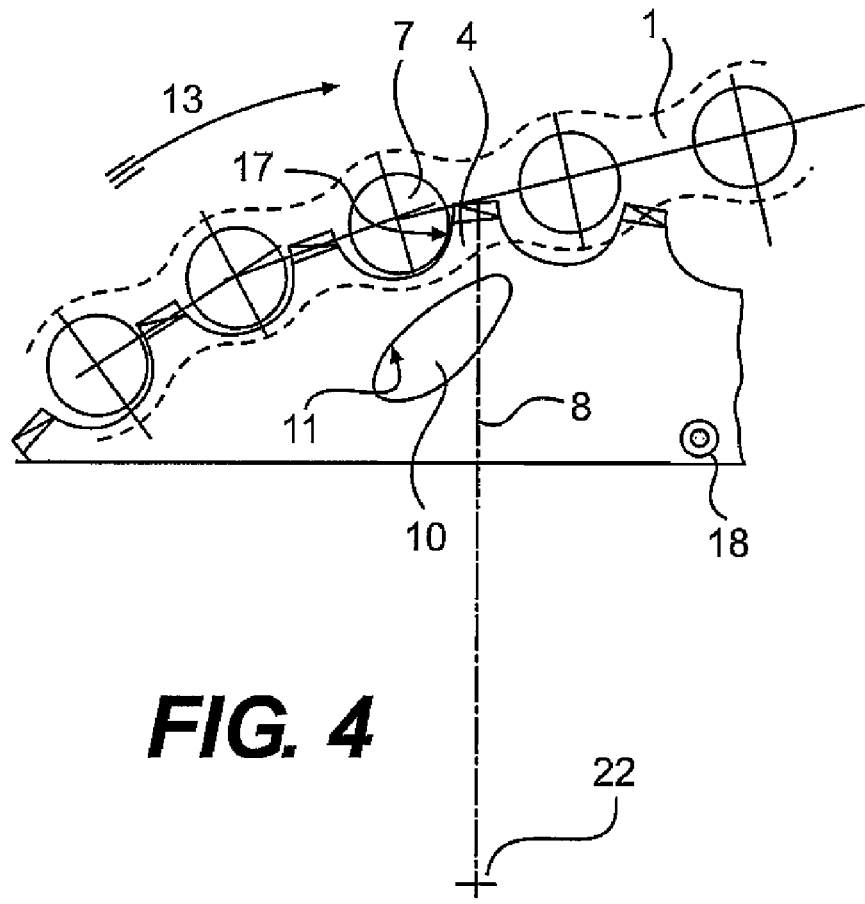
FIG. 4 is a partial view of the sprocket showing a portion of a chain engaging the sprocket.

Looking to FIGS. 3 and 4, during bicycle operation, a chain 1 sequentially engages the plurality of teeth 3 on the sprocket 2 and transfers torque to the drive element 12. Three rollers 7 of the chain 1 are received in each tooth gap between two consecutive teeth 3 and apply a force 17 against the load-bearing flank 5 on each tooth of the sprocket 2. Two rollers 7 have already come out of engagement with the sprocket 2.

FIG. 1 shows a deflection 19 of a single tooth 4 as a result of the force 17 being applied to the load-bearing flank 5 of the tooth 4. Under load, the first load strip 14 is under tension, whereas the second load strip 15 is under compression. Looking to FIG. 2, under load, the first load strip 16 of an adjoining tooth 24 in the drive rotational direction is loaded in bending by the compression-loaded second load strip 15, thereby increasing the elasticity of the tooth 4. Accordingly, in FIG. 2, the tooth 4 experiences a deflection 20 that is greater than the deflection 19 of the tooth 4 in FIG. 1 because the first load strip 16 provides additional elasticity for the tooth 4.

While this invention has been described by reference to one or more embodiments, it should be understood that numerous changes could be made within the spirit and scope of the inventive concepts described. Accordingly, it is intended that the invention not be limited to the disclosed embodiment, but that it have the full scope permitted by the language of the following claims.

What is claimed:

1. A sprocket for transferring a force between a chain and a drive element, the sprocket comprising:
- a plurality of teeth disposed around a periphery of the sprocket, and having load-bearing flanks and non-load-bearing flanks;
- a plurality of openings disposed proximate the plurality of teeth in one-to-one correspondence therebetween, the openings asymmetrically divided by radial centerlines of the corresponding teeth;
- a plurality of first load strips formed between the openings and the load-bearing flanks of the corresponding teeth; and
- a plurality of second load strips formed between the openings and the non-load-bearing flanks of the corresponding teeth,
- the plurality of teeth, openings and first and second load strips arranged in one-to-one correspondence therebetween,
- wherein when the load-bearing flank of one of plurality of teeth is engaged by the chain, the corresponding one of the plurality of first load strips is loaded in tension, the corresponding one of the plurality of second load strips is loaded in compression and the first load strip of the adjoining tooth in the drive rotational direction is loaded in bending by the compression-loaded second load strip.

2. The sprocket of claim 1, wherein the first load strip is longer than the second load strip.

3. The sprocket of claim 1, wherein the sprocket includes a first tooth having a first tooth contour and a corresponding first opening having a first opening contour and an adjoining second tooth having a second tooth contour different from the first tooth contour and a corresponding adjoining second opening having a second opening contour different from the first opening contour.

4. The sprocket of claim 1, wherein the plurality of teeth, openings and first and second load strips are arranged in one-to-one correspondence about an entire circumference of the sprocket.

* * * * *